R. C. MITCHELL.
BALL BEARING.
APPLICATION FILED JAN. 7, 1915.
1,165,111.
Patented Dec. 21, 1915.
2 SHEETS—SHEET 1.
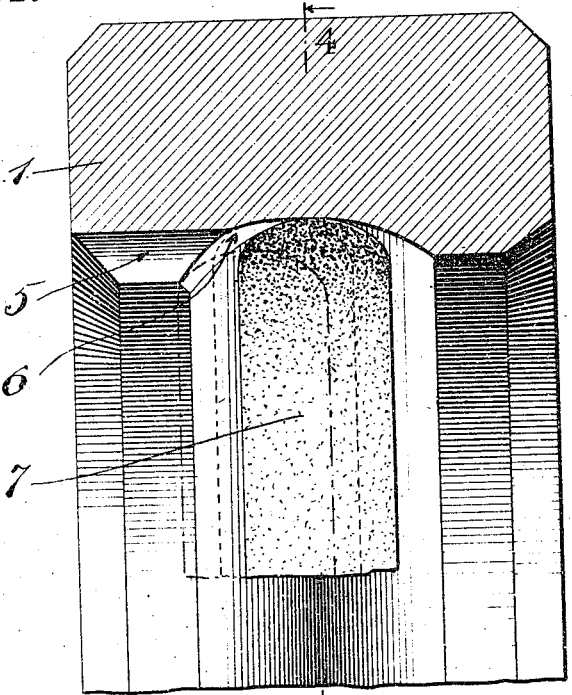
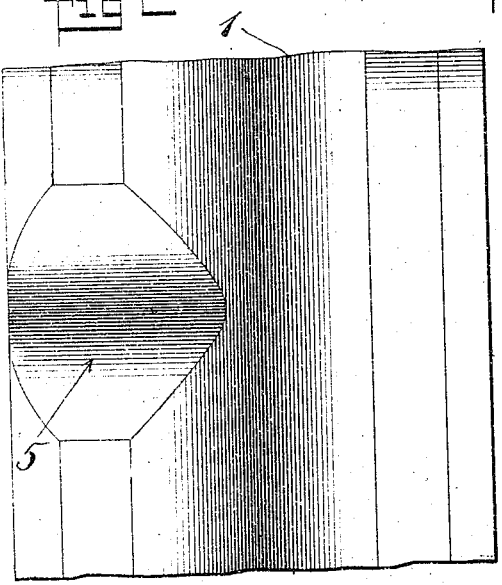 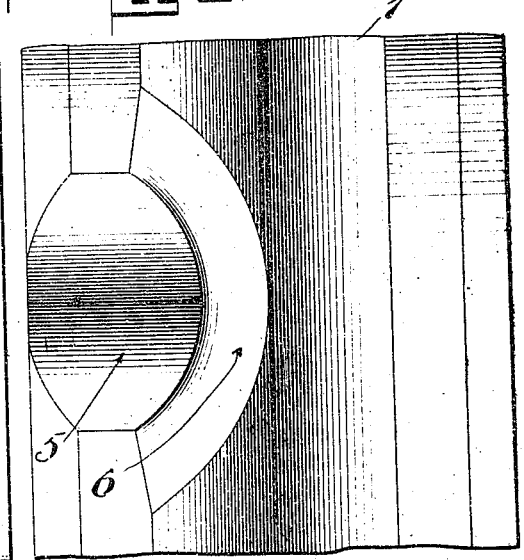
Witnesses:
Inventor

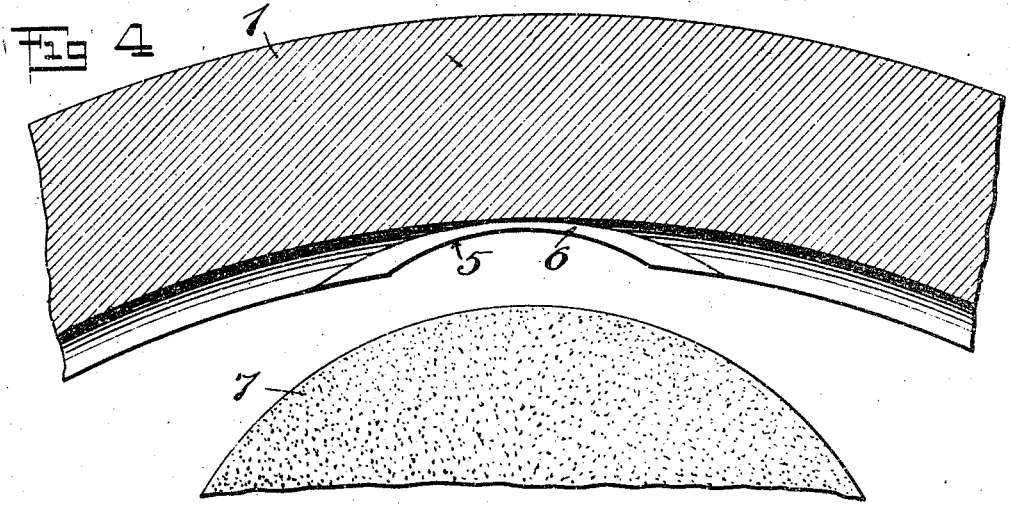
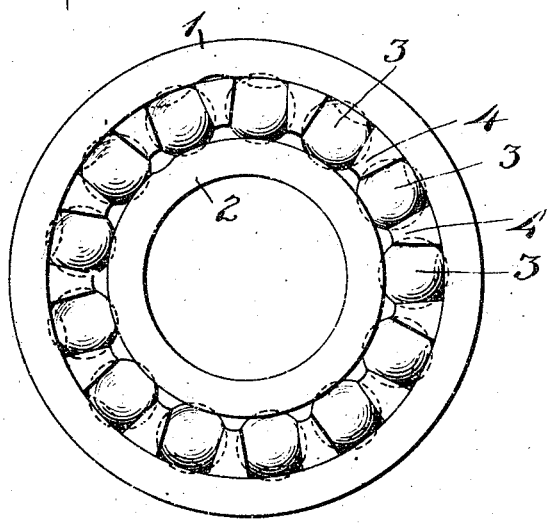
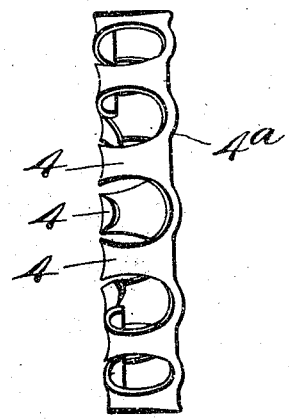

UNITED STATES PATENT OFFICE.

ROBERT C. MITCHELL, OF MOUNT VERNON, NEW YORK.

BALL-BEARING.

1,165,111.  Specification of Letters Patent.  Patented Dec. 21, 1915.

Application filed January 7, 1915. Serial No. 897.

*To all whom it may concern:*

Be it known that I, ROBERT C. MITCHELL, a citizen of the United States, residing at Mount Vernon, Westchester county, State of New York, have invented certain new and useful Improvements in Ball-Bearings, of which the following is a full, clear, and exact description.

My invention relates to ball bearings and has particular reference to an improved bearing ring construction, the advantages of which will be hereinafter described.

In the drawings—Figure 1 is a cross-section on an enlarged scale of part of one of the rings of a ball bearing containing my improvement and showing a part of a grinding wheel. Fig. 2 is a face view of that part of the ring shown in Fig. 1, but before said ring is completed. Fig. 3 is a similar view of the same part completed. Fig. 4 is a section of that portion of the ring shown in Fig. 1, that section being taken on the plane of the line 4—4 looking in the direction of the arrow, the grinding wheel being shifted from the position shown in Fig. 1. Fig. 5 is an end view of a ball bearing complete. Fig. 6 is an edge view of a ball spacer and retainer.

1 represents the outside bearing ring.

2 represents the inside bearing ring.

3—3 represent balls located and running in race-ways formed in the adjacent faces of the rings 1—2.

4—4 are curled spacer fingers all carried by a backing ring 4ª. This backing together with the fingers constitutes a combined ball spacer and retainer serving to space the balls slightly from each other and also to keep them in correct alinement. The retainer is not new, but is preferably used to avoid friction between the balls. Since the load carrying capacity and the durability of a bearing depends largely upon the number of balls employed, it is desirable to use as many as possible. Since the rings 1—2 are integral, it is clear that only about half of a full complement of balls can be freely introduced. That number may be obviously introduced by merely displacing the rings eccentrically. The balance of the balls must be inserted when the rings are in operative position, and hence, notches are commonly employed through which such balls are successively passed into the race-way. If such entrance notches are full depth throughout, the balls may be introduced without straining. If not full depth, pressure is required, and the passage of the several balls from the inner end of the non-full depth notch into the operative position tends to cut a groove, which though slight, tends to make the bearing noisy. For this reason, it is desirable to have a full depth side entrance notch. It should be borne in mind that bearings of this type are made with great accuracy, and it is obviously difficult to form side entrance notches which invariably extend to the exact full depth of the race-way groove. If they do not extend to the bottom of the groove then the aforesaid objectionable strain occurs upon the assembling of the notch introduced balls. As already stated, my invention aims to produce a notch which overcomes these difficulties, and to provide a reliable method for producing such notches uniformly. To that end I form each notch by two separate steps.

In Fig. 2 I have shown at 5 what corresponds to an ordinary non-full depth notch. I form this much of my new notch by a suitable tool which is relatively small and rapid in action. This part of the notch is extended as near to the bottom of the race-way as can be safely done when working rapidly. I complete the notch after the race-way is ground, and preferably by the grinding wheel utilized for the race-way. In grinding bearing rings of this type, the ring is set up in a suitable machine and is moved against the grinding wheel by a proper mechanical means manually controlled. When the race-way grinding operation is completed and without disturbing the position of the wheel relatively to the bottom of the groove, I turn the ring so as to present the inner end of the previously formed main portion 5 of the notch to the said wheel, and I then move the parts so that the wheel will move laterally relatively to the bottom of the race-way so as to form the inner portion 6 of the notch (see Figs. 3 and 4). The race grinding wheel being much larger in circumference than the grinding wheel used for forming the part 5, acts not only to cut the notch down to the mathematical bottom of the race-way groove, but also removes the relatively abrupt shoulders at the inner end of the non-full depth notch portion 5 so that balls in traversing the inner end of said notch will not pound. It is obviously possible to move the grinding wheel 7 entirely through the side wall of the bearing ring at one side of the race, but the same is preferably withdrawn as indicated by dotted lines in Fig. 1 after a sufficient portion of the metal has been ground away, to secure the full depth effect whereby strain is relieved in inserting the notch introduced balls, and whereby the abrupt shoulders at the inner end of the notch portion 5 are removed. It is preferable to remove the grinding wheel at this time to avoid unduly wearing one side thereof, because the main function of that wheel is to grind the race-way and accordingly both sides of the wheel should correspond and be true. It is well known that in actual practice in such bearings, the balls do not travel at all times upon a mathematical center line of the race-way, but that the points of contact shift from side to side of that line according to the particular strains to which the bearing is subjected. Such bearings are designed to withstand and do withstand not only radial but also axial and twisting strains. Again, while in bearings of this character it is common to refer to the contact of a ball with the race-way as a point contact, nevertheless, it is a fact that under load each ball tends to flatten, so that the "point" of contact under load is really not a point; but a contact zone of substantial proportions, in contrast to a point. For all of these reasons the ball track in the race-way, instead of being a fixed line, is, in fact, a track of considerable width and surface area which increases with use and wear. It is because of this fact that notched bearings as heretofore made, whether the notches have been of the full depth, or of the nearly full depth, type, have been relatively noisy, owing to the impact of the balls against the relatively abrupt shoulders at the inner ends of the notches whenever the balls have traveled on the notched side of the race-way. By my improvement, these relatively abrupt shoulders are removed, so that even though the balls travel at times on that side of the race-way and over the end of the notch, there is no objectionable impact, noise or wear. While it may be said that there is a very slight shoulder at the inner end of the final cut or portion 6 of the notch, this is so slight and is so immaterial after polishing, that its presence is in no way objectionable.

I have shown my improved notch as applied to the outer ring where the balls move on the inside of the circle, and where, in the absence of my improvement, the ball impact at the end of a notch of the old type would be substantial. The same notch construction may be, if desired, used for the notch on the outer side of the inner ring, but I have found that in practice this is not always required, because the balls moving on the outside of the circle of the inner ring have less tendency to strike with objectionable force against the shoulders at the inner end of an ordinary notch either of the full depth or nearly full depth type.

It will be noted the ball entrance notch is always formed in that face of the ring in which the ball race-way is located; that the main portion of said notch leads into the race-way transversely from one edge of the ring; that the inner end of said notch is extended in a direction transversely to the said main portion and longitudinally of the race-way itself, and that in all instances this specially formed inner end of the notch never extends below the bottom of said race-way. Thus, the balls are always properly supported and will traverse the inner end of the notch without objectionable noise or resistance.

In Fig. 5 I have shown the bearing complete and of the type in which the ball spacer and retainer is used, but it should be understood that in certain types of bearings designed to perform certain kinds of work, the spacer may be omitted and the balls provided in such a number as to practically fill the race-way.

In all instances the inner end of the notch or ball entrance channel is relatively flatter than that part of the notch immediately adjacent thereto, this flattening of the inner end of the notch serving to cut down the objectionable relatively abrupt shoulders which would otherwise extend into the effective path of travel of the balls.

What I claim is:

1. A ball bearing ring having an annular grooved race-way, and a ball entrance channel in that face of the ring in which the race-way is located, said channel leading laterally into one side of said race-way, the inner end of that part of said channel which extends into said groove being relatively flatter and broader than that part immediately outside thereof, said inner end of said channel extending substantially down to but not below the bottom of said race-way groove.

2. In a ball bearing, a ring having an annular grooved race-way therein and a ball entrance notch in the face of the ring in which said race-way is located, the main portion of said notch leading into said race-way transversely from one edge of the ring, the inner end of said notch extending transversely of said main portion and longitudinally of said race-way, said inner end also extending substantially to, but not below, the bottom of said race-way groove, part of the main portion of said notch being less than the full depth of said race-way.

3. In a ball bearing, a ring having an annular grooved race-way therein and a ball entrance notch in the face of the ring in which said race-way is located, the main portion of said notch being of less depth than the full depth of said race-way and leading into said race-way transversely from one edge of the ring, the inner end of said notch extending transversely of the main portion and longitudinally of said race-way, said transversely extended inner end also extending substantially down to, but not below the bottom of said race-way groove.

4. In a ball bearing, a ring having an annular grooved race-way therein, and a ball entrance notch in the face of the ring in which said race-way is located, the main portion of said notch leading into said race-way transversely from each edge of the ring, part of the main portion of said notch being of less depth than the full depth of the race-way, the inner end of said notch being wider than that part thereof immediately to the rear thereof, said inner end also extending substantially to, but not below, the bottom of said race-way groove.

5. In a ball bearing of the character described, a ring having a race-way therein and a ball entrance notch extending from one side of the ring to the bottom of the race-way, one of the shoulders at least at the inner end of said notch being cut down adjacent to the bottom of said race-way groove.

ROBERT C. MITCHELL.

Witnesses:
  HENDERSON F. HILL,
  R. G. MITCHELL.